United States Patent [19]

Platzer, Jr.

[11] 4,114,574

[45] Sep. 19, 1978

[54] ELECTRONIC SPARK TIMING ADVANCE CONTROLLER

[75] Inventor: George E. Platzer, Jr., Southfield, Mich.

[73] Assignee: Chrysler Corporation, Highland Park, Mich.

[21] Appl. No.: 663,895

[22] Filed: Mar. 4, 1976

Related U.S. Application Data

[63] Continuation of Ser. No. 322,577, Jan. 10, 1973, abandoned.

[51] Int. Cl.² .................................................. F02P 5/04
[52] U.S. Cl. .................................................. 123/117 R
[58] Field of Search ........ 123/148 E, 117 R, 146.5 A; 307/269; 328/63

[56] References Cited

U.S. PATENT DOCUMENTS

| 3,592,178 | 7/1971 | Schiff | 123/117 R |
|---|---|---|---|
| 3,660,689 | 5/1972 | Oishi et al. | 123/148 E |
| 3,738,339 | 6/1973 | Huntzinger et al. | 123/117 R |
| 3,756,212 | 9/1973 | Schirmer et al. | 123/117 R |
| 3,799,134 | 3/1974 | Griese | 60/284 |
| 3,813,877 | 6/1974 | Hunt | 60/284 |

*Primary Examiner*—Ronald B. Cox
*Attorney, Agent, or Firm*—Baldwin & Newtson

[57] ABSTRACT

An electronic spark timing advance controller for variably controlling the degree of advance or retardation of the firing event of an internal combustion engine integrates an engine speed signal to produce a signal, which is proportional to engine angular position and is reset at a predetermined reference point or angular position of the engine prior to the firing of each cylinder of the engine. A signal, which is proportional to a predetermined firing angle of the engine, is compared with the engine angular position signal to produce an output signal, which is supplied to spark generating means to produce a spark when the compared signals have a predetermined relation to each other. Additional signals, which vary in accordance with a predetermined engine speed advance characteristic and a predetermined engine vacuum advance characteristic, affect the comparison to vary the firing angle of the engine in accordance with the corresponding engine operating parameters.

Additional control over the engine timing is provided in the subject timing controller in which the spark timing is retarded at temperatures below the operating temperature of the catalytic reactor installed on an emission controlled engine. The operation of the engine at a retarded spark condition increases the temperature of the exhaust gases supplied to the reactor to provide rapid or accelerated warm-up of the reactor to its effective operating temperature.

10 Claims, 4 Drawing Figures

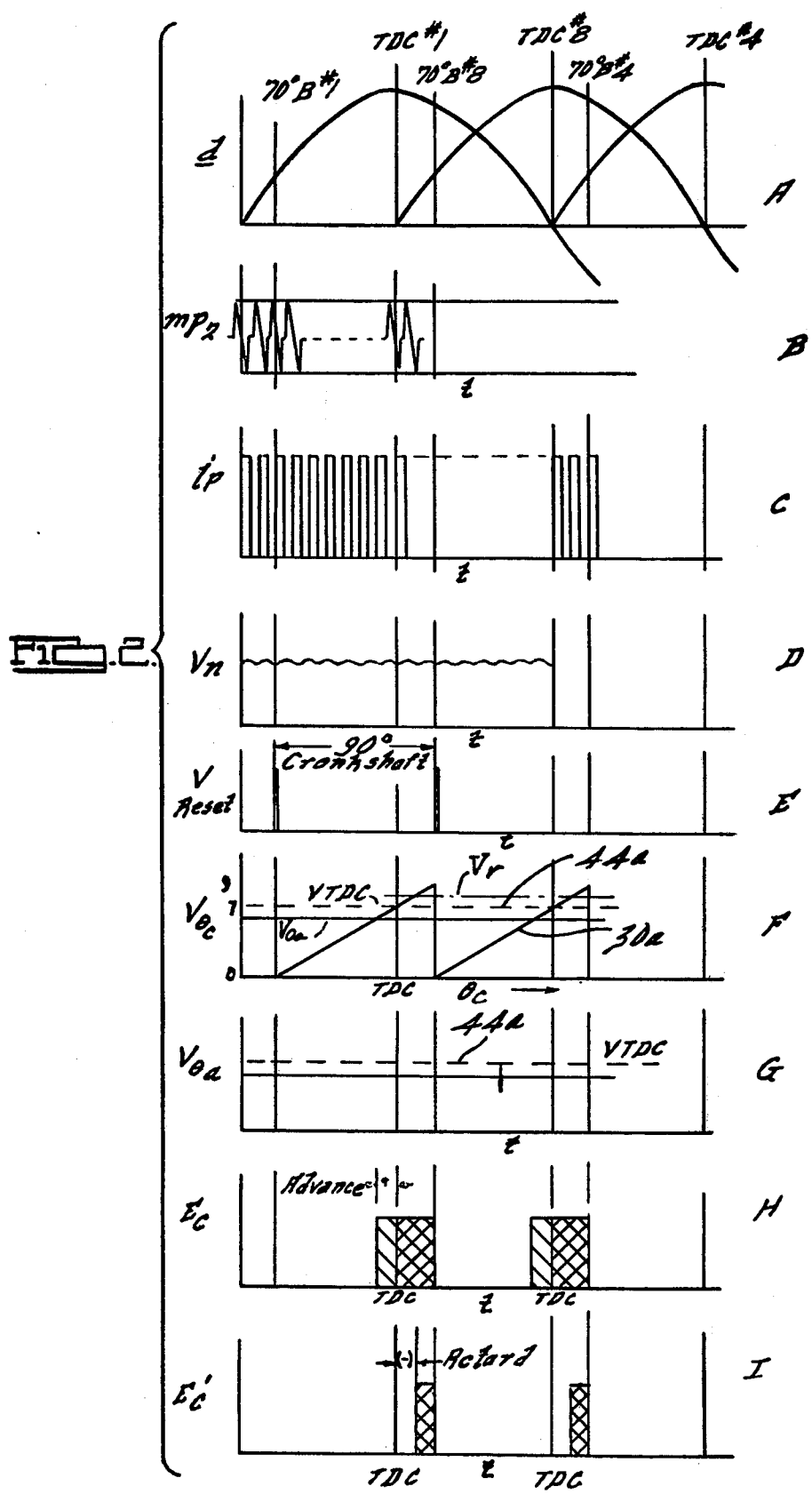

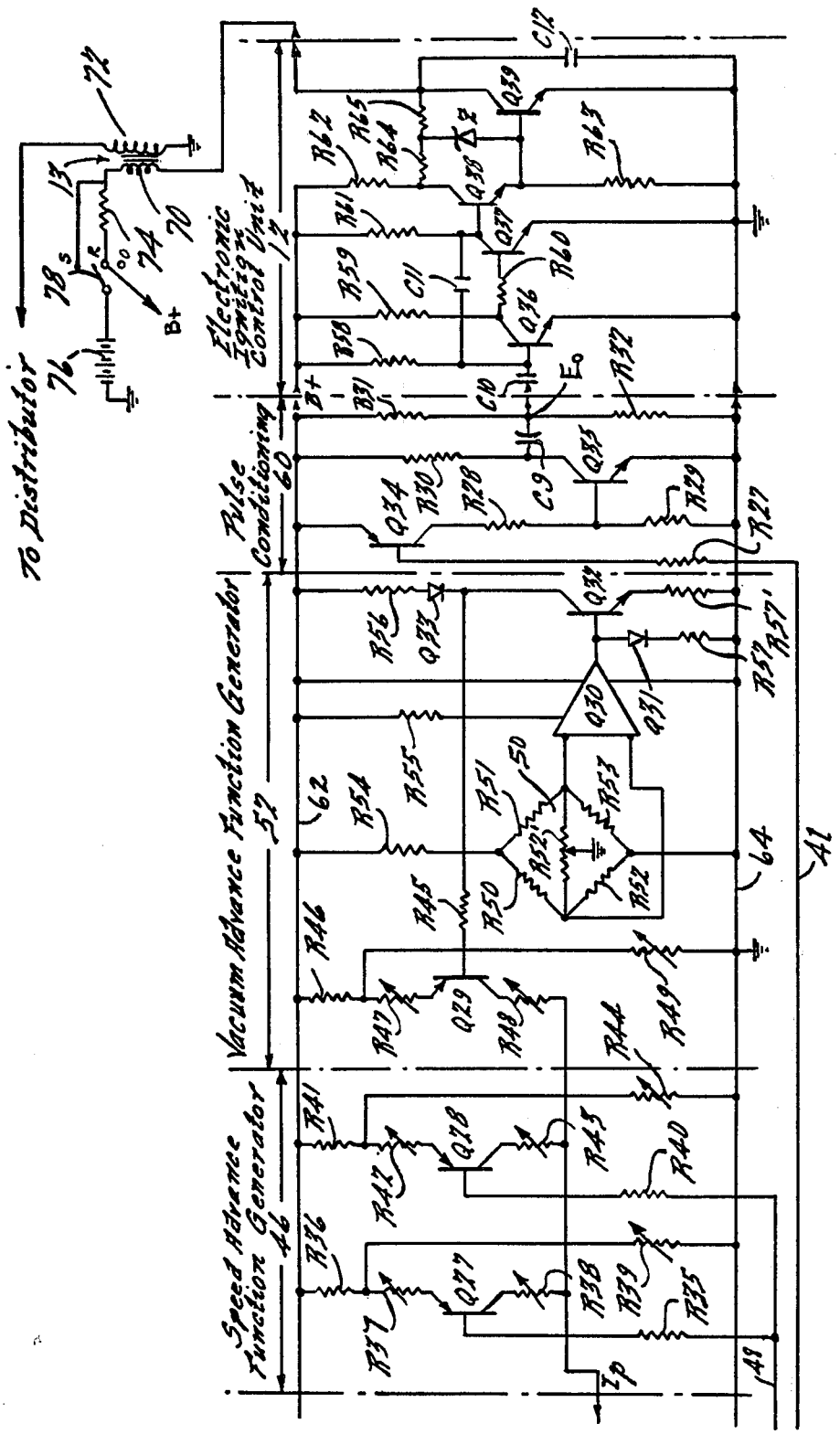

4,114,574

ELECTRONIC SPARK TIMING ADVANCE CONTROLLER

This application is a Continuation of application Ser. No. 322,577, filed Jan. 10, 1973 now abandoned.

FIELD OF THE INVENTION

This invention relates to electronic ignition systems for internal combustion engines, and more particularly, to an electronic ignition spark timing advance controller for variably controlling the degree of spark advance or retardation of the firing event of an internal combustion engine.

BACKGROUND AND SUMMARY

Such timing advance control has heretofore been accomplished in contact breaker type ignition systems by mechanical expedients as conventional centrifugally actuated advance and vacuum diaphragm actuator structures, which have been added to the ignition distributor to produce a progressive mechanical displacement of certain distributor components relative to the breaker points within the ignition distributor. With the advent of electronic breakerless or contactless ignition systems, it is desired to eliminate these mechanical timing control instrumentalities and to accomplish the requisite timing advance in an electronic manner for reasons of economy, simplification of the distributor structure and preciseness of timing control.

In one such ignition system as set forth in U.S. Pat. No. 3,314,407, electrical pulses developed by a pulse generator responsive to engine speed are used to produce an electrical signal of repeating sawtooth waveform and of a repetition rate related to engine speed. The sawtooth signal is integrated to derive a d.c. signal, which is equal to the peak value of the waveform and is inversely related to engine speed. The integrated signal is applied to an amplifier whose gain is chosen to be equal to or less than unity and whose output is compared to the repeating sawtooth waveform to derive a basic timing control or trigger signal for initiating the pulsing of a pulsed ignition system at a point or time related to the orientation of the pulse generator to the engine. The amplifier notably is of the variable gain variety whose gain is varied inversely in accordance with predetermined engine operating parameters, as speed and vacuum, to advance or vary the time of occurrence of the trigger signal for pulsing the ignition system.

In accordance with the present invention, an electronic spark advance timing control is provided for an electronic breakerless ignition system for an internal combustion engine wherein the timing control is provided by waveform comparison of a first electrical signal representing instantaneous engine rotational position and a second electrical signal of a substantially fixed level proportionally related to a predetermined firing angle. The occurrence of the firing event in advance of or retardation relative to the predetermined firing angle is affected by modulating one of said first and second electrical signals with one or more additional electrical signals each of which varies in accordance with a different engine operating parameter and is directly added to the signal to be modulated. The apparatus of the present invention generates a crankshaft position signal whose amplitude is independent of engine speed so as to avoid the need for a variable gain amplifier as well as the need for the peak position signal derivation as required by the prior art system and permits a plurality of timing modulation signals to be straight forwardly added to not only advance, but also to retard, the spark timing.

Another feature of the invention resides in the provision in the subject electronic spark timing advance controller of a fast warm-up control for catalytic or reactor-equipped emission controlled internal combustion engines. Present automotive catalysts and reactor systems require a minimum temperature, usually in excess of 1200° F., for effective activity. This presents a problem during the engine warm-up period, since the catalyst or reactor cannot be immediately effective. The apparatus of the present invention decreases the warm-up time by increasing the heat rejection to the exhaust by operating the engine at retarded spark timing during the warm-up period, the retardation of the spark timing being accomplished electrically with the subject electronic spark timing control apparatus used to vary the spark timing of the engine.

The various features and advantages of the invention will best be understood by reference to the following description of an illustrative embodiment of the invention made with reference to the accompanying drawings of which:

FIG. 1 is a functional block diagram of an electronic spark timing advance control system in accordance with the invention;

FIG. 2A-I are waveforms useful in explaining the operation of FIG. 1; and

FIGS. 3A and 3B are an electrical schematic circuit diagram for implementing the system of FIG. 1.

DESCRIPTION OF THE PREFERRED EMBODIMENT

Reference is made herein to related copending U.S. Pat. application Ser. No. 322,243, now U.S. Pat. No. 3,910,243, for a related form of electronic spark timing angle controller of common ownership herewith.

Figure 1:
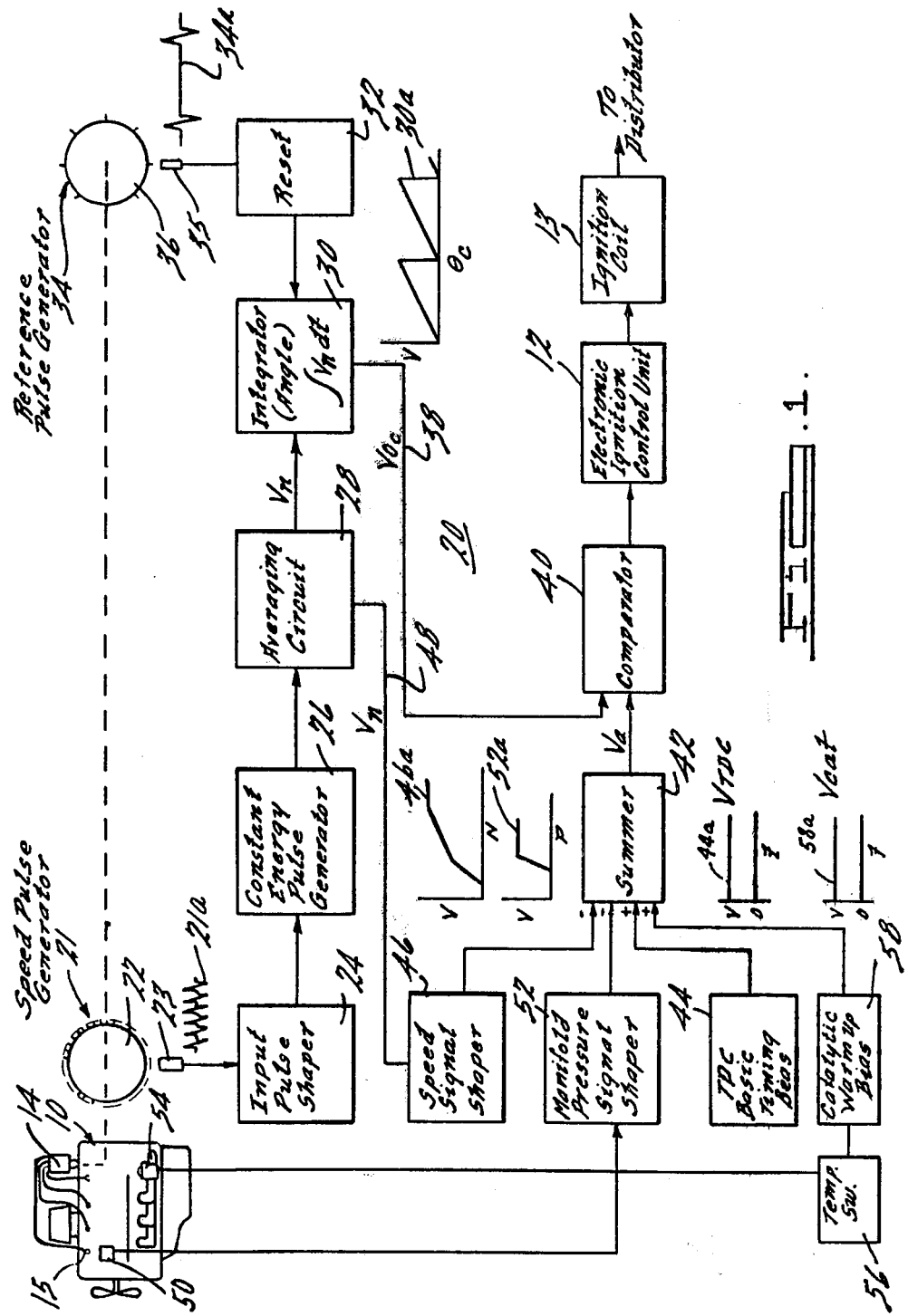

In FIG. 1 there is represented a four cycle internal combustion engine 10 having an electronic contactless ignition control unit 12, which generates ignition trigger signals from an applied input signal whose occurrence in time or angular relationship to a predetermined angular position of the engine is varied in accordance with the electronic spark timing advance controller 20 comprised of the remaining components of the illustrated system. The ignition trigger pulses control the pulsing of the ignition coil 13, the high tension secondary voltage from which is applied through the distributor 14 to the spark plugs 15 of the engine.

The spark timing advance controller 20 comprises a series of electrical stages including a speed pulse generator 21; input pulse shaper 24; constant energy pulse generator 26; an averaging circuit 28; and an integrator 30, which is reset from a reset circuit 32 by a reference pulse generator 34 every $\omega = 2\pi/C$ degrees of engine crankshaft rotation, where $\omega = 2\pi$ radians or 360 degrees and C is the number of cylinders in the engine 10. The output $V\theta_c$ of the integrator 30 is a uniformly varying voltage ramp shown at 30a, which represents the instantaneous angular position $\theta_c$ of the engine crankshaft and is supplied over line 38 to one of the inputs of a comparator device 40, the other input of which is connected to receive the output of a suitable summing means 42.

One of the inputs to the summer 42 is supplied from a fixed bias source 44, which furnishes a constant level "TDC" signal shown at 44a whose amplitude is selected to equal the amplitude of the engine position signal from the integrator 30 at a predetermined angular position of the engine, such as, but not necessarily limited to, the top dead center position of a piston in an engine cylinder.

Another input to the summer 42 is supplied from a speed signal shaper or scaler device 46, which receives a speed signal over line 48 from the averaging circuit 28, the output of the signal shaper or scaler device varying as a predetermined function of engine speed and partaking of the form of the customary engine governor advance characteristic shown at 46a.

Another input to the summer 42 is supplied from a suitable engine vacuum responsive transducer 50, which develops an output signal that varies in accordance with engine manifold vacuum as shown at 50a and is supplied to a pressure signal shaper or scaler device 52 whose output varies as a predetermined function of engine vacuum, as shown at 52a. Additional inputs to the summer 42 may be applied from other engine-associated transducers and signal shaper or scaler devices as later described.

The output of the comparator 40 is a trigger pulse, which is produced when the output of the integrator attains the amplitude of the constant bias TDC signal and which occurs in time at the TDC position of the crankshaft in the absence of any advance signals applied to the summer 42. The comparator output pulse is supplied to the ignition coil switching control unit 12, which is a solid state breakerless or contactless form of switching unit similar to that disclosed in copending U.S. Ser. No. 148,354 now U.S. Pat. No. 3,749,974 of common ownership herewith.

The speed pulse generator 21 is shown as a multiple toothed reluctor wheel 22 illustrated as having 36 teeth thereon and driven by the engine past a magnetic pickup coil 23 which supplies to the input pulse shaper 24 a trair of bipolar pulses of a repetition rate proportional to engine speed, as shown at 21a FIG. 1 and mp2 in FIG. 2B. By reason of the magnetic character of the pickup device, the shape, including the amplitude and width, of the induced voltage pulses in the pickup coil, varies with engine speed. It is the function of the pulse shaper 24 and the constant energy pulse generator 26 to shape and transform the speed pulses to pulses of constant amplitude and width as shown in FIG. 2C so that, by counting or averaging the transformed or shaped pulses, an accurate signal representation of engine speed is derived at the output of the averaging circuit 28 as shown in FIG. 2D. The output of the averaging circuit is applied to the integrator circuit 30 to derive a repeating electrical signal shown in FIG. 2F and representing the instantaneous engine angular position in accordance with the following theory.

Mathematically, the voltage output of the averaging circuit may be represented as:

$$V_N = K \cdot N = K' \cdot d\theta c/dt \quad (1)$$

where:
$V_N$ = voltage output of averaging circuit in volts,
$N$ = engine speed in rpm,
$K$ = a proportionality constant,
$d\theta c/dt$ = crankshaft engine speed in radians/second,
$K'$ = a proportionality constant.
Rearrangement of equation (1) yields the expression $$d\theta_c = V_N/K' \, dt \quad (2)$$

from which the crank angle $\theta c$ traversed by the engine between times $t_1$ and $t_2$ can be determined by integration to yield:

$$\theta c = \int_{t_1}^{t_2} \frac{V_N}{K'} dt. \quad (3)$$

The integrator 30 of FIG. 1 thus functions to produce an output voltage $V\theta_c$, which is proportional to the crank angle $\theta c$ over the range of integration of the expression:

$$\theta c = K_1 \int_{t_1}^{t_2} V_N dt. \quad (4)$$

By relating the output voltage of the integrator to a predetermined reference point and setting the range of integration thereof, the instantaneous output of the integrator will be a direct representation of the angular position of the engine relative to the reference point. This is accomplished by the reference pulse generator 34, which generates at regularly spaced intervals a reference pulse 34a early in the rise of a piston in its cylinder on the compression stroke. In the described embodiment of the invention, the reference pulse is generated at 70° before the top dead center (BTC) position of the engine as indicated in FIG. 2A, which represents the harmonic displacement of several engine cylinder pistons driven by the crankshaft. The reference pulse generator 34 and its associated reset circuit 32 provides a shaped pulse of the character shown in FIG. 2E to reset the integrator to zero at the selected reference angle so that the instantaneous output of the integrator will be directly proportional to the angular position of the engine from the BTC or reference position of the engine.

The reference pulse generator 34 comprises a magnetic pickup coil 35 and a reluctor wheel 36, which are mounted within the housing of the ignition distributor 14. The reluctor wheel 36 is mounted on the distributor rotor shaft, which is driven by the engine camshaft at half engine or crankshaft speed and has an even number of equally angularly spaced teeth thereon corresponding to the number of cylinders of the engine. Thus, in the case of an 8 cylinder engine, the reluctor wheel would have eight teeth thereon as indicated and a reference or reset pulse is generated every 45 degrees of engine camshaft or 90° of crankshaft rotation as shown in FIG. 2E. By adjusting the angular position of the pulse generator pickup coil 35 relative to the position of the reluctor wheel 36 on the distributor rotor shaft, which has a known preset relationship to the engine camshaft, the pulses supplied from the reference pulse generator may be adjusted to occur in time or spatial relationship with any selected position of a piston in the engine.

As shown in FIG. 2F, the reference pulse generator thus resets the integrator every 90° of crankshaft rotation, and the output of the integrator appears as a linearly varying voltage ramp starting from an initial value or 0 volts at 70° BTC, passing through the TDC position and attaining its peak of say 9.0 volts at 20° past TDC. It will be appreciated that the peak value of the integrator voltage at the end of 90° is always the same and independent of engine speed. At low engine speed, the voltage $V_N$ is small, but the integration time is long. At high engine speed, the voltage $V_N$ is high, but the integration time is short. Thus, the output voltage of the integrator does not vary with engine speed, but will always be proportional to the engine crank angle or position after the occurrence of the 70° BTC reference pulse. It will thus be appreciated that the integrtor output voltage will be directly and uniquely related to the crank angle position of the engine and will always have the same instantaneous amplitude for a corresponding crank angle position of the engine irrespective of engine speed.

The fixed bias source 44 provides a D.C. output voltage 44a of a predetermined level shown in FIG. 2F equal to the magnitude attained by the engine position ramp signal at the TDC position of the engine. Thus, when the bias signal is applied with the engine position signal to the respective inputs of the comparator device 40, the latter produces an output therefrom when the amplitude of the crank angle and engine position signal 30a attains the level of the fixed bias of TDC signal 44a at the TDC or 0° advance position of the engine as shown by the double hatched and dashed-line bounded pulse in FIG. 2H.

By modulating one or the other of the signals $V\theta_c$ or $V_{TDC}$ with one or more shaped advance or delay signals, as the advance signals 46a and/or 52a of FIG. 1, the point of terms of time or engine crank angle at which the comparator 40 produces an output is shifted to the left or to the right of the TDC position to produce a controlled amount of spark advance (+) or retard (−) from TDC of the timing pulse applied to the electronic ignition control unit 12 as indicated in FIGS. 2H and 2I.

In FIG. 2G, the summer 42 modulates or algebraically combines an instantaneous value of the shaped speed characteristic signal and of the shaped pressure characeristic signal with the constant bias TDC signal to produce a voltage $V_a$, called the advance voltage signal, which is proportional to the desired firing angle or advance under corresponding vehicle operating conditions and is supplied to one of the inputs of the comparator 40.

Alternatively, the summer or equivalent summing junction could be included in the line 38 where the speed characteristic signal 46a and pressure characteristic signal 52a could be algebracially summed with the integrated signal $V\theta_c$ from the integrator 30 to effect a vertical upward or downward shift or displacement of the crank angle position signal of FIG. 2F and the resultant signal could be compared with the constant level TDC signal 44a. The system of FIG. 1 is designed and implemented in such fashion as to accomplish the basic engine timing control functions which are related to engine operating conditions, such as speed and pressure. In addition, it is designed and implemented in such fashion as to also accommodate and account for any other monitored quantities which have a bearing on engine timing selection as engine temperature, atmospheric pressure and any of the emission control techniques, as catalyst temperature for example.

An example of one of the latter types of additionally monitored quantities is the aforementioned catalytic warm-up temperature feature, which is readily incorporated in the apparatus of the present invention to affect the engine timing. As shown in FIG. 1, the accelerated warm-up of the catalyst or reactor 54 is accomplished by retardation of the engine spark timing to increase the heat rejection of the engine until the temperature of the reactor has attained its effective operating temperature. This is accomplished with a suitable temperature switch 56, which senses the reactor temperature and is operative or closed at temeratures below the critical or operating temperature of the catalyst or reactor device. The temperature switch is connected to a bias source 58, which provides a constant level output signal therefrom of a predetermined level and polarity as shown at 58a and supplies this signal to one of the inputs of the summer 42 to be algebraically added to the TDC bias signal from source 44 while the temperature switch is closed or operative. The warm-up signal is combined with the TDC signal in such a manner as to raise or elevate the level of the output of the summer 42 to the level $Vt$ so that the output of the comparator 40 will occur or be produced at a later point in time or crank angle position between the TDC position and the peak value of the position signal of FIG. 2F and will, therefore, be retarded relative to or occur after the TDC position thereof.

Figure 3A:
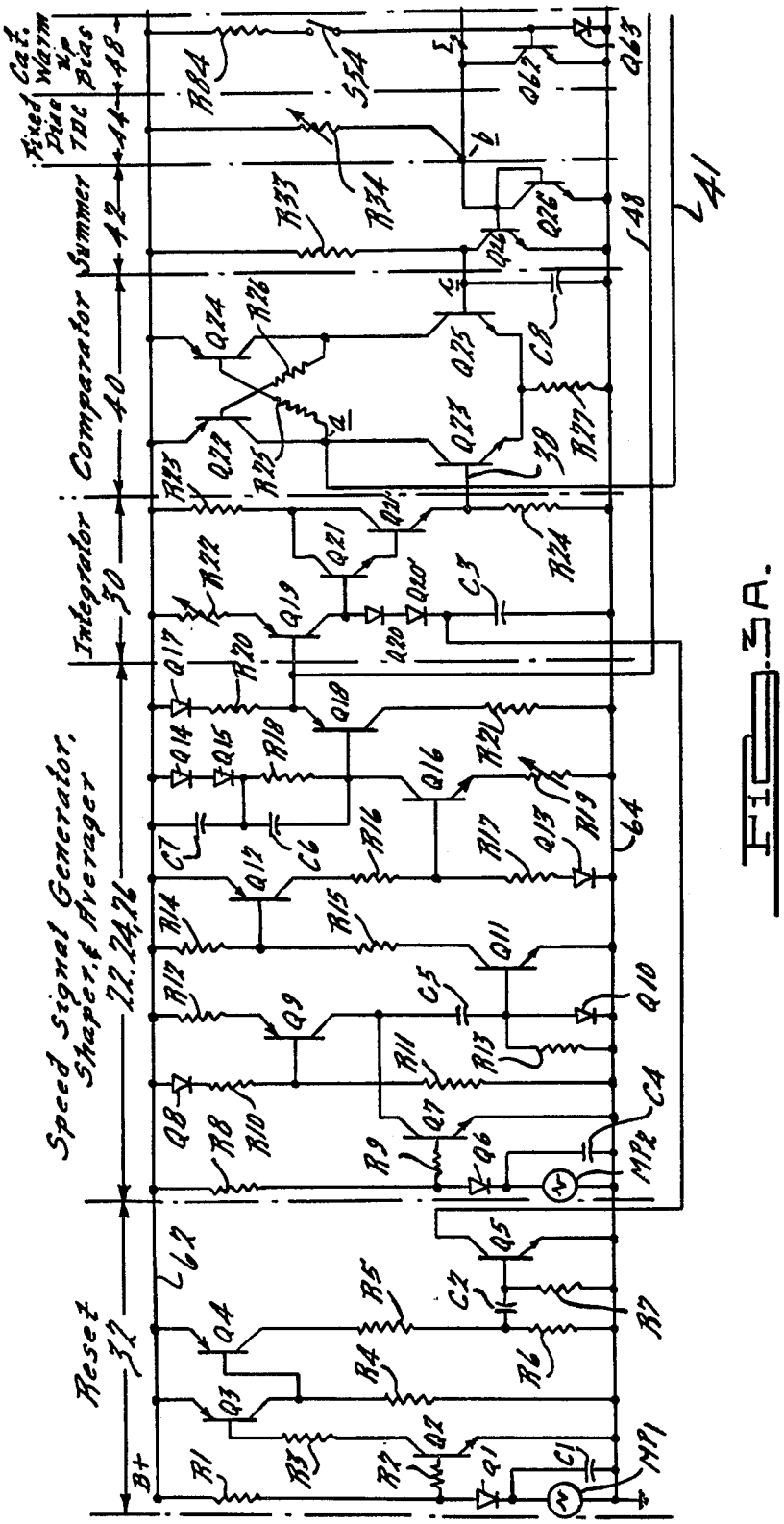

Turning now to FIGS. 3A and 3B, there is illustrated an electrical schematic circuit of one manner of implementing the functions of the electronic spark timing advance control sytem of FIG. 1.

The components labelled $MP_2$, Q6–Q12, R8–R21 and C4–C7 comprise the speed signal generating, shaping and averaging portions of the circuit corresponding to the speed pulse generator 21, input pulse shaper 24, constant energy pulse generator 26 and averaging circit 28 elements of FIG. 1.

The reference pulse generator 34 and reset circuit 32 are constituted by the components labelled $MP_1$, Q1–Q5, R1–R7 and C1, C2.

The function of the integrator 30 is accomplished by the components labelled Q19–Q21, R22–24, and C3.

The function of the comparator 40 is provided by the components labelled Q22–Q25 and R25–27.

The summer device 42 is shown as a summing amplifier comprised of the components labelled C8, R33 and Q26.

R34 and the B+ source constitute the TDC basic timing bias source 44, while R84, switch S54, Q62 and Q63 make up the catalytic warm-up bias circuit 48.

The speed signal shaper or function generator 46 as shown in FIG. 3B comprises the components labelled Q27, Q28 and R35–R44, while the manifold pressure signal shaper or function generator 52 is formed by the elements R45–R57' and Q29–Q33.

The output of the comparator 40 is taken over line 41 to a pulse conditioning stage 60 shown as comprising the elements R28–R32, Q34, Q35 and C8. The output of the pulse conditioning circuit is supplied as a voltage $E_o$ to the electronic contactless ignition control unit 12, which is associated with the ignition coil 13 of the engine and comprises the components Q36–Q39, R58–R65, Zener diode Z, and C10–C12.

In operation, the aforementioned speed signal section provides an analog signal proportional to engine speed from the train of bipolar pulses shown at FIG. 2B generated by the magnetic pickup MP2 corresponding to component 21 in FIG. 1. The pickup coil 23 of MP2 is shown connected across the potential supply source from B+ bus 62 through resistor R8 and diode Q6 to the ground return bus 64. As a tooth of the reluctor wheel 22 passes the center of the pole of the pickup coil 23 spaced therefrom by a narrow air gap, the pickup has a positive going voltage induced therein that attains a peak amplitude from which it decreases from positive through zero when the reluctor tooth is located at the center of the pole tip and then goes negative.

Semi-conductor elements Q6-Q11 constitute the input pulse shaper 24 of FIG. 1. Transistor Q7, which has its base connected through R9 to the junction of R8 and R6, is normally conducting and is biased on by the voltage across diode Q6, the bias current through which is limited by R8. The emitter-base voltage for Q7 is the sum of the voltages across Q6 and MP$_2$. Q6 essentially biases Q7 at the quiescent or operating point thereof and makes Q7 sensitive to small voltages across MP$_2$. When MP$_2$ goes about 50 millivolts negative, Q7 turns off. It should be pointed out that the diode Q6, like the various other diodes Q1, Q8, Q10, Q13, Q14, Q15, Q17, Q20, Q20', Q31, Q33, Q63 illustrated in circuit, is a diode-connected transistor of the same type as its associated transistor Q7 or the transistor with which the diode is used in order to provide accurate voltage and temperature tracking.

Transistor Q9, diode-connected transistor Q10 and transistor Q11 comprise a constant pulse width generator. Diode-connected transistor Q8 and its associated transistor Q9 constitute a constant current generator, which charges C5 when transistor Q7 is turned off. C5 charges until transistor Q9 goes into saturation at which time the current through R12 then flows into the emitter-base diode junction of transistor Q9 and through R11. The charging current through C5 turns on transistor Q11, and as soon as Q9 saturates, Q11 turns off. This arrangement provides an inexpensive pulse generator of reasonably good temperature stability.

The semi-conductor elements Q12, Q13 and Q16 take the constant width pulses from Q11 and convert them to constant energy pulses. Transistor Q12 is an inverter. Diode-connected transistor Q13, transistor Q16 and R16, R17 and R19 comprise a constant current source. Hence, pulses of constant width and constant current are generated in the collector of Q16.

These pulses are averaged by R18 and C7, which correspond to the pulse averaging circuit 28 of FIG. 1, and an analog voltage of the character shown in FIG. 2D proportional to pulse repetition rate or engine speed appears across R18 and C6. Because of the matching voltage drops across Q14 and Q15 and across Q17 and $V_{be}$ of Q19, the voltage across R18 appears across R20. Transistor Q18, which has its emitter connected to the base of Q19 and its collector connected to the negative bus, is a voltage follower, which buffers R18 from succeeding stages. The voltage across R20 appears across resistor R22. Hence, the necessity of Q17 to match the emitter-base voltage of Q19, which is also a voltage follower used as a current source. Since it was necessary to use Q17 for the benefit of Q19, it was necessary to use two diodes, Q14 and Q15 to match the diode voltages of Q17 and Q18.

Transistor Q19 is a current source, which provides the charging current for C3, the integrating capacitor of the integrator stage 30 in FIG. 1. As shown earlier, the voltage across C3 is the time integral of engine speed or angular position and is a voltage ramp, which is reset from its peak of 9.0 v to 0v every 90° of crankshaft rotation by transfer Q5 of the reset circuit 32.

The reset circuit includes the semi-conductor elements Q1-Q5 and the refernce pulse generator 34 designated MP1, which is similar in construction to the speed pulse generator MP2, except that in the illustrated embodiment of the invention, it has a lesser number of teeth on the reluctor wheel thereof than the number of teeth on the reluctor wheel 22 of speed pulse generator 20 (MP2). The reference pulse generator generates a bipolar pulse 34a which occurs every 90 degrees of crankshaft rotation and is applied to the base of transistor Q2 through R2. The emitter-base voltage for Q2 is the sum of the voltages across MP1 and diode-connected transistor Q1, which is poled in a direction to compensate for the $V_{be}$ effect of Q2 and make Q2 sensitive to small amplitude voltages generated at MP1. The capacitors C1 and C4 connected across the lines from pickups MP1 and MP2 function to by-pass noise.

When the voltage generated by MP1 goes slightly negative, transistor Q2 turns off, thereby also turning off transistor Q3. Transistor Q4 thus turns on because of the emitter base current of Q4, which can now flow through R4 connected in the collector circuit of Q3. Current can now flow in the emitter-base circuit of transistor Q5 until C2 is charged. The charging time for C2 is about 10 micro-seconds and establishes the width of the reset pulse, shown in FIG. 2E.

When Q5 is turned on hard, it discharges C3, which is the integrating capacitor for engine angle and has been charging through Q19 of the integrator stage 30. R6 and R7 discharge C2 during the time Q5 is off. The ramp voltage appears across C3, and at maximum engine RPM is about 2.5 milli-seconds in duration. The 10 micro-seconds discharge time for C2 is of extremely short duration relative to the ramp duration at maximum engine RPM and, therefore, does not affect the peak value of the ramp voltage.

The integrating capacitor C3 is coupled to Q21, which is a Darlington voltage follower that reflects the voltage across C3 to appear across R24. To compensate for the emitter-base voltage drops in Q21, two diodes are used in the integrator. The diodes used are a diode connected Darlington Q20, Q20', exactly like Q21, Q21' in which the diode connection is made by connecting the base to the collector.

The ramp output voltage of the integrator is applied to the base of Q23 as one of the inputs to the comparator 40, which employs a pair of high gain differential amplifiers comprised of a first pair of cross-coupled PNP transistors Q22 and Q24 and a second pair of NPN transistors Q23 and Q25 whose emitted and connected through a common resistor R27 to ground.

To understand the operation of the comparator, assume the—voltage proportional to the desired firing angle has been supplied to the base of Q25 from the output of the summer device. The other input to the comparator is the ramp voltage, which is supplied from the integrator stage to the base of Q23 and which at some point will equal $V_{be}25$. At this time it is desired to generate a pulse to fire the solid state ignition system 12. With $V_{be}$ of Q23 below $V_{be}$ of Q25, Q23 and nonconducting and Q25 is conducting, which makes Q22 conduct. Hence point a the output of the comparator, is essentially at B+, as Q22 is in saturation. Transistor Q24 is turned off, as Q23 is non-conducting. As the ramp voltage at $V_{be}23$ comes up to $V_{be}25$, transistor Q22 comes out of saturation and Q24 begins to conduct. At the same time, Q24 goes into saturation, turning off Q22, and dropping point "a" to nearly $V_{be}23$. Thus, a regenerative type of switching action occurs and a very fast transfer at the transition point takes place.

The summer section 42, which supplies the summed fixed bias TDC advance signals to the other input of Q25 of the comparator, includes a pair of matched transistors Q26, 26', which are normally intended for differential amplifier operation and structurally are mounted on the same substrate for temperature tracking. In the present application, one of the transistors Q26' has been diode connected and then connected across the emitter-base diode of the other transistor, Q26. This is a so called "current mirror" arrangement the theory of which is more fully explained in U.S. Pat. Nos. 3,152,250; 3,197,626 and 3,423,578 all of common ownership herewith. If current is directed through the diode-connected transistor Q26', the same magnitude of current will appear in the collector circuit of the other transistor Q26 assuming matched devices and a high beta in the normally operated transistor. This arrangement is used in this current as a summing amplifier in which point "b" is a summing junction for currents proportional to the advance signals. Point "b" is obviously a voltage stable point, since the voltage drop across the diode-connected transistor Q26' is nearly constant and stays at about 0.6 volts above ground from microamperes to a few milliamperes of current flow therethrough.

A first signal is applied to the summer by the current through R34 that is supplied from B+ and flows through R34 through the diode-connected transistor Q26'. As the current through R34 increases, the current in the collector of the normally operated transistor Q26 increases. Hence, the voltage drop across R33 is increased, and the voltage at point "c" decreases. R34 is adjusted to give the voltage at point "c" ($V_b25$) at which an ignition pulse will be produced at TDC. From the foregoing, this voltage will be 7.0 volts with reference to the values indicated in FIG. 2F.

In addition to the fixed bias level (TDC) signal supplied to the summer 42 from resistor R34, the summer also receives a speed advance signal and a vacuum advance signal from the speed advance function generator 46 and the vacuum advance function generator 52. The speed advance function generator includes the transistors Q27 and Q28 and generates a double sloped speed advance signal. Q27 resembles a voltage follower, which reproduces the voltage across R20 in the output of the speed pulse averager circuit across R36 and R37. The divider formed by R36 and R39 is connected at its junction point to emitter resistor R37 and introduces a voltage drop across R36 which is of a polarity to turn Q27 off. No current can flow in the collector of Q27 until the speed signal exceeds the voltage across R36, which is of low ohmic value compared to R37.

As the speed signal $V_N$ from the output of the speed signal section 60 increases above the initial conduction point of Q27, the current in the collector of Q27 increases, and in fact has a value of $$i = V_N - VR36)/ R37. \quad (5)$$

Differentiating equation (5), it is seen that $$di/dv = 1/R37.$$

Thus, R37 sets the rate of change of spark advance signal current with engine speed. The collector current continues to increase with engine speed up to the point where all of the supply voltage is used up, i.e. when Q27 goes into saturation. The saturation point is determined by the value of R38. The larger that R38 is, the sooner the advance uses up the voltage. At the saturation point, the collector current of Q27 ceases to change as the engine speed increases. Hence, there is provided an advance current signal, which starts at a given engine speed, increases at a controllable rate, and then levels off at a selected value to produce one segment of an advance curve.

The collector current of Q27 is steered or flows into the diode-connected transistor Q26 where it is summed with the current through R34. Increasing current into point "b" further increases the current in R33, which lowers the voltage at point "c" and makes the ignition pulse occur at a lesser angle or an advanced angle. If no advance is desired up to 1500 RPM, R39 is adjusted to yield this condition. If it is desired to provide 20° of advance in going from 1500 RPM to 2500 RPM, R37 is adjusted to give this rate. If no advance is desired after 2500 RPM at the rate given by R37, R43 is adjusted to saturate Q27 at 2500 RPM.

Q28 is a stage like Q27. Its operation is identical but its values are adjusted to give another leg on the advance curve. For example, to work with the values set for Q27, R44 would be adjusted to prevent any collector current in Q28 until the engine speed attains 2500 RPM. Then, the required slope and saturation points would be set.

Q29 is another stage like Q27 and Q28, but is responsive to a manifold vacuum signal. A manifold vacuum signal is shown as being derived from a strain gauge bridge transducer 50 comprised of resistors R50, R51, R52 and R53. R49 supplies a bias current to the bridge, and R54 is an offset null control. Q30 is an operational amplifier, which amplifies the output of the strain gauge and provides a current output proportional to vacuum. Q31 and Q32 invert this signal, which then appears across R56 and Q33 and is applied to the summing junction line $\Sigma j$ by Q29.

The output of the comparator is supplied over line 41 to the pulse conditioning circuit 60, which comprises the transistors Q34, Q35, R28-32 and C8. Divider R31 and R32 provide a positive voltage at Eo except when the transition occurs at point "a" of the comparator. Then Q34 and Q35 provide a negative going pulse through C8 at Eo to the solid state electronic ignition unit 12.

In the ignition unit, Q36 is biased on by means of R59 and R58. Q37 has its base interconnected with the collector of Q36 by R60. Accordingly, Q37 is turned on as Q36 is turned off by the negative going pulse applied thereto from C8. The ignition circuit, including Q37 operates as a monostable or one-shot circuit by means of the capacitive coupling C10 between the collector of Q37 and the base of Q36. In addition, an RC time constant and positive feedback latch is provided by the resistors R61 and R58, which are connected between the collector electrode of Q37 and the base or input electrode of Q36.

The collector electrode of transistor Q37 is connected to the base electrode of Q38, the collector of which is connected through a resistor R62 to B+. The emitter electrode of Q38 is connected to ground through R63 and also to the input of Q39. Limitations on the current and voltge applicable across the primary electrodes of Q38 is accomplished by means of a Zener diode Z, which is connected across the transistor terminals, as shown. It will be appreciated that as Q37 turns on, Q38 and Q39 turn off. A capacitor C12 is connected across the primary electrodes of Q39.

The collector electrode of Q39 is connected in series with the primary winding 70 of the ignition coil 13 and ballast resistor 74, which is connected to the vehicle storage battery 76 through the vehicle ignition switch 78 as indicated. Primary coil winding 70 is magnetically coupled with the ignition secondary coil 72, which is interconnected directly with the high voltage distribution element of the distributor 14 by which the high voltage ignition pulses are sequentially applied to the spark igniting devices or spark plugs 15 of the engine.

The catalyst warm-up circuit is shown in FIG. 3A as comprising the transistor Q62 with draws off or "sinks" a constant amount of current from the summing ignition at the collector of Q26. It sinks a part of the fixed bias current from R34. Switch S54 is the catalyst temperature controlled or sensor switch. When the temperature is low, the switch is closed which allows current to flow through diode Q63. Q63 and Q62 comprise a current mirror and Q62 sinks current out of the summing junction. This arrangement effectively reduces the fixed bias and retards the ignition angle. Retarding the timing angle increases the heat rejection to the exhaust and hence increases the catalyst warm-up time. When the catalyst comes up to temperature, the switch S54 opens, and the timing angle returns to normal.

The above described circuit exemplifies but one manner of carrying out the invention which may be implemented in various other circuit forms including the use of operational amplifier and integrated circuit components instead of the discrete component form illustrated. It is apparent that various other changes can be made in the circuit implementation including the use of a single or a common pickup for the speed pulse generator 21, and the reference pulse generator 34, which could be substituted for the speed pulse generator 21 and would reset the integrator 30 therefrom.

What is claimed is:

1. An electronic spark timing advance ignition system for an internal combustion engine comprising:

means for generating a first electrical signal quantity whose amplitude varies with engine speed and for deriving from said first electrical signal quantity a cyclically repeating second electrical signal quantity whose amplitude varies independently of engine speed as a function of the angular rotational position of the engine crankshaft and reaches the same peak amplitude each cycle of repetition thereof, said means including an electrical signal pulse generator having a predetermined angular positional setting relative to the engine crankshaft and driven thereby for producing a train of pulses having a repetition rate related to engine speed and integrator means having an integrating input terminal coupled to receive said first signal quantity and a reset input terminal coupled to said signal pulse generator to be electrically reset by each and every signal pulse therefrom at said predetermined angular positional setting thereof relative to the engine crankshaft for producing said second electrical signal quantity from said first electrical signal quantity;

means for producing a reference electrical signal quantity of a predetermined fixed amplitude value independent of the engine speed related first signal quantity and the engine crankshaft position related second signal quantity, said refernce signal quantity corresponding to the amplitude value of said second electrical signal quantity at a predetermined initial angular position of the crankshaft at which it is desired to fire the engine;

comparing means having an input terminal coupled to receive said second electrical signal quantity and another input terminal coupled to receive said reference electrical signal quantity for comparing said signal quantities to produce an ignition trigger signal at said predetermined initial angular position of the engine crankshaft; and means for modifying the occurrence of said ignition trigger signal in accordance with said first electrical signal quantity including means for algebraically combining said first electrical signal quantity with said reference electrical signal quantity and applying the combined electrical signal therefrom to said comparing means for comparison with said second electrical signal quantity.

said combining means connected between the integrating input terminal of said integrator means and the said another input terminal of said comparing means.

2. An electronic ignition system in accordance with claim 1 wherein said first named means includes pulse averaging means connected between said electrical signal pulse generator and the said integrating input terminal of said integrator means and wherein said pulse averaging means is connected to supply an output signal therefrom to said combining means.

3. An electronic ignition system in accordance with claim 1 including means for generating a third electrical signal quantity which is related to another engine operating parameter and for applying said third electrical signal quantity to said combining means for combination with said first electrical signal quantity and said reference electrical signal quantity.

4. An electronic ignition system in accordance with claim 3 wherein said third electrical signal varies in accordance with engine vacuum.

5. An electronic ignition system in accordance with claim 3 including means for generating a fourth electrical signal quantity and for combining said fourth electrical signal quantity with said third electrical signal quantity, said first electrical signal quantity and said reference electrical signal quantity.

6. An electronic ignition system in accordance with claim 5 wherein said fourth electrical signal quantity is of a fixed level and of a polarity to retard the timing of the firing of the engine.

7. An electronic ignition system in accordance with claim 6 including means for sensing the temperature of an emissions reduction chamber device connected to receive the engine exhaust and operative at a critical operating temperature and for controlling the application of said fourth electrical signal quantity to said combining means to retard the timing of the engine until the sensed temperature attains said critical operating temperature.

8. Apparatus in accordance with claim 1 wherein said third electrical signal is of a fixed level and of a polarity to retard the timing of the firing event in a cylinder of the engine.

9. Apparatus in accordance with claim 8 including means for sensing a temperature in the engine and controlling the application of said third electrical signal to said combining means to retard the timing of the engine until the sensed temperature attains a predetermined value.

10. Apparatus in accordance with claim 9 wherein the sensed temperature is that of an emissions reduction chamber device connected to receive the engine exhaust and operative at a critical operating temperature.

* * * * *